(12) United States Patent
Chamberlain et al.

(10) Patent No.: US 10,370,301 B2
(45) Date of Patent: Aug. 6, 2019

(54) CERAMIC MATRIX COMPOSITE AND METHOD AND ARTICLE OF MANUFACTURE

(71) Applicant: Rolls-Royce Corporation, Indianapolis, IN (US)

(72) Inventors: Adam L. Chamberlain, Mooresville, IN (US); Andrew J. Lazur, Huntingdon Beach, CA (US); Robert J. Shinavski, Mission Viejo, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 1379 days.

(21) Appl. No.: 14/210,928

(22) Filed: Mar. 14, 2014

(65) Prior Publication Data

US 2014/0272373 A1    Sep. 18, 2014

Related U.S. Application Data

(60) Provisional application No. 61/787,619, filed on Mar. 15, 2013.

(51) Int. Cl.
| | | |
|---|---|---|
| *C04B 35/80* | (2006.01) |
| *C04B 35/622* | (2006.01) |
| *C04B 35/565* | (2006.01) |
| *C04B 35/628* | (2006.01) |

(52) U.S. Cl.
CPC .......... *C04B 35/806* (2013.01); *C04B 35/565* (2013.01); *C04B 35/62222* (2013.01); *C04B 35/62868* (2013.01); *C04B 35/62873* (2013.01); *C04B 35/62884* (2013.01); *C04B 2235/3826* (2013.01); *C04B 2235/3856* (2013.01); *C04B 2235/3873* (2013.01); *C04B 2235/422* (2013.01); *C04B 2235/428* (2013.01); *C04B 2235/522* (2013.01); *C04B 2235/5244* (2013.01); *C04B 2235/5248* (2013.01); *C04B 2235/614* (2013.01); *C04B 2235/616* (2013.01); *C04B 2235/77* (2013.01); *Y10T 428/249928* (2015.04)

(58) Field of Classification Search
None
See application file for complete search history.

(56) References Cited

U.S. PATENT DOCUMENTS

| | | |
|---|---|---|
| 5,079,039 A | 1/1992 | Heraud et al. |
| 5,455,106 A | 10/1995 | Steffier |
| 5,545,435 A | 8/1996 | Steffier |
| 5,558,907 A | 9/1996 | Steffier |
| 6,068,930 A | 5/2000 | Lamouroux et al. |

(Continued)

FOREIGN PATENT DOCUMENTS

EP    2543650 A1    1/2013

OTHER PUBLICATIONS

Carlo Alberto Nannetti, "Manufacturing SiC-Fiber-Reinforced SiC Matrix Composites by Improved CVI/Slurry Infiltration/Polymer Impregnation and Pyrolysis." Journal of the American Ceramic Society 87.7 (2004): 1205-1209.

(Continued)

*Primary Examiner* — Chinessa T. Golden
(74) *Attorney, Agent, or Firm* — Brinks Gilson & Lione

(57) ABSTRACT

A ceramic matrix composite having improved operating characteristics includes a barrier layer.

12 Claims, 2 Drawing Sheets

(56) References Cited

U.S. PATENT DOCUMENTS

| | | | |
|---|---|---|---|
| 6,235,379 | B1 | 5/2001 | Kameda et al. |
| 6,365,233 | B1 | 4/2002 | Corman et al. |
| 6,783,824 | B2 | 8/2004 | Steffier |
| 7,297,368 | B2 | 11/2007 | Williams et al. |
| 7,651,726 | B2 | 1/2010 | Souto et al. |
| 7,736,554 | B2 | 6/2010 | Thebault et al. |
| 8,039,053 | B2 | 10/2011 | Philippe et al. |
| 8,221,836 | B2 | 7/2012 | Philippe et al. |
| 2006/0004169 | A1* | 1/2006 | Sherwood, Jr. ......... B22F 3/002 528/10 |
| 2006/0147622 | A1* | 7/2006 | Gray .................. C04B 35/573 427/180 |
| 2007/0128421 | A1* | 6/2007 | Lee .................. C04B 35/521 428/292.1 |
| 2011/0156297 | A1 | 6/2011 | La Forest et al. |
| 2011/0215502 | A1 | 9/2011 | Carper et al. |
| 2012/0076927 | A1 | 3/2012 | Bhatt et al. |

OTHER PUBLICATIONS

International Search Report for PCT International Application Serial No. PCT/US2014/027183 completed Jun. 4, 2014.

* cited by examiner

US 10,370,301 B2

CERAMIC MATRIX COMPOSITE AND METHOD AND ARTICLE OF MANUFACTURE

CROSS REFERENCE TO RELATED APPLICATIONS

This application claims priority to and the benefit of U.S. Provisional Patent Application No. 61/787,619 filed 15 Mar. 2013, the disclosure of which is now expressly incorporated herein by reference.

FIELD OF THE DISCLOSURE

The present disclosure relates generally to ceramic matrix composites (CMC), and more specifically to CMCs formed with a protective barrier to reduce degradation of the CMC.

BACKGROUND

Ceramic Matrix Composites (CMCs) are materials that include ceramic fibers embedded in a ceramic matrix. CMCs typically exhibit desirable mechanical, chemical and physical properties at high temperatures. For example, CMGs are typically more resistant to oxidation at high temperatures than are metals. CMGs are generally tougher than monolithic ceramics and exhibit damage tolerance. Accordingly, CMCs are suitable for a number of high temperature applications, such as for example and without limitation use in producing components of gas turbine engines. Gas turbine engines illustratively are used to power aircraft, watercraft, power generators, and the like. CMC components illustratively may operate at much higher temperatures than other components, including for example superalloy metal components.

CMCs may be produced by a variety of processes. For example, fiber interfaces of a fiber preform may be coated using chemical vapor infiltration (CVI). Illustratively, a rigidization layer may also be applied by CVI, and particulates or other matter may be introduced by slurry and/or melt infiltration. The melt infiltration may react with the rigidization layer leading to performance degradations in the composite and even the fiber from this melt attack.

SUMMARY

The present application discloses one or more of the features recited in the appended claims and/or the following features which, alone or in any combination, may comprise patentable subject matter.

An illustrative ceramic matrix composite (CMC) generally comprises a matrix and a fiber preform embedded within the matrix; wherein the matrix includes a rigidization layer or portion, an infiltration layer or portion, and a rigidization barrier or barrier layer sandwiched between the rigidization layer and the infiltration layer. Such an illustrative CMC may be relatively dense, having a porosity of less than about 5% by volume.

According to another aspect of the present disclosure, an illustrative method of manufacturing a CMC is provided. For example, an illustrative method may comprise providing a fiber preform, providing or depositing a rigidization layer or portion, providing or depositing a rigidization barrier layer; and providing or introducing an infiltration layer. The infiltration layer step illustratively may include particulate infiltration and melt infiltration. The illustrative method may further include the step of coating the fiber with an interface coating or layer. Illustratively, each of the fiber interface layer, the rigidization layer and the barrier layer may be deposited by any suitable method including without limitation CVI. The illustrative method of manufacturing a CMC may produce a relatively dense CMC, for example having a porosity of less than about 5% by volume.

Illustratively, the fiber preform of the CMC and/or the method may comprise any suitable fiber, for example and without limitation the fiber may be carbon fiber, oxide ceramic fiber, silicon carbide fiber (SiC), and silicon-nitrocarbide (SiNC) fiber. The fiber may be stoichiometric or non-stoichiometric or a combination thereof. It will also be appreciated that the preform or article could consist of any suitable arrangement of fibers including for example and without limitation unidirectional fibers, woven fabric, braided fiber, and the like. It will be appreciated that multiple fiber bundles or tows of the fibers may be formed into 2D or 3D preforms that meet the desired component size and shape. Illustratively, the fiber preform comprises between about 14% and about 46% of the total volume of the CMC.

In some embodiments of the CMC and/or the method there will be a fiber interface coating or layer. Illustratively, the type and need for such an interface coating is generally a function of the type of fiber used. For example, a fiber interface coating, illustratively of boron nitride (BN) or pyrolytic carbon (PyC), is recommended or required for use with SiC or SiNC fiber. In the case of carbon fibers, a carbon interface illustratively might be used. In the case of oxide fibers, an interface layer illustratively may or may not be used. In any event, the fiber interface coating or layer illustratively may be deposited by for example chemical vapor infiltration (CVI) or other suitable method on the surface of the fiber. Illustratively, the fiber interface coating or layer generally encapsulates, surrounds or coats the fiber. Illustratively, the fiber interface coating or layer comprises between about 0.09% and about 11% of the total volume of the CMC.

Illustratively, the rigidization layer or portion of the CMC and/or method may be provided, deposited or introduced by for example CVI. Illustratively, the rigidization barrier may be any suitable material for example and without limitation it may comprise SiC. Illustratively, the rigidization layer comprises between about 14% and about 41% of the total volume of the CMC.

The illustrative rigidization barrier layer of the CMC and/or method illustratively may be provided, deposited or introduced by for example CVI on the surface of the rigidization layer or portion. Illustratively, the rigidization barrier may be any suitable material or combination of materials. For example and without limitation a rigidization barrier of silicon-nitro-carbide (SiNC), silicon nitride ($Si_3N_4$), or PyC or combination thereof may be deposited on the rigidization layer. For example and without limitation, a combination of a SiNC and PyC layer may be used. Such a combination illustratively could take the form of separate layers, or could be deposited as a mixture or graded layer. The barrier layer illustratively is deposited on the rigidization layer and is generally coterminous or coextensive therewith. Thus, the barrier layer illustratively and generally overlays and insulates the rigidization layer from the infiltration layer or portion. Illustratively, the rigidization barrier may range in width or thickness from about 0.1 μm and about 10 μm. Further illustratively, the rigidization barrier layer may range in width or thickness from about 1 μm and about 2 μm. The width or thickness illustratively may be determined by the number of depositions of the rigidization barrier. Illustratively, the rigidization barrier comprises between about 1% and about 11% of the total volume of the CMC.

The illustrative embodiments also include the use of subsequent coatings, for example by CVI, of a wide range of compositions as well as multi-layer alternations of barrier layer and rigidization.

Illustratively, particulate matter or additives of the CMC and/or method may be introduced into the illustrative CMC. For example and without limitation particulate matter may be provided or introduced by slurry infiltration. Suitable particulate matter includes for example SiC. The slurry-introduced SiC illustratively may provide capillary action for additional matter infiltration. This additional matter, for example and without limitation a metal or metalloid such as for example and without limitation silicon, may be introduced by for example melt infiltration. Illustratively, the slurry particulate additives comprise between about 9% and about 56% of the total volume of the CMC. Further illustratively, the melt infiltration additives comprise between about 4% and about 21% of the total volume of the CMC.

Illustratively, the illustrative embodiments of the CMC and/or method may accommodate multiple melt infiltrations, and relatively high melt infiltration times and temperatures, including for example temperatures up to at least about 2600° F. (1427° C.). The illustrative embodiments will discourage or reduce, if not eliminate melt infiltration reaction, for example silicon attack, with the matrix and fiber. It will be appreciated that the illustrative embodiments will also produce for example and without limitation CMCs that are stronger (interlaminar tensile strength and fatigue strength), longer-lived (for example part life ($t_{life}$) exceeding 20,000 hours), and more easily and cheaply and quickly manufactured.

In yet another aspect of the disclosure, an illustrative CMC article of manufacture, for example and without limitation a component for a gas turbine engine, may be formed by the illustrative method and/or using the illustrative CMCs disclosed herein.

These and other features of the present disclosure will become more apparent from the following description of the illustrative embodiments.

DETAILED DESCRIPTION OF THE DRAWINGS

Figure 1:
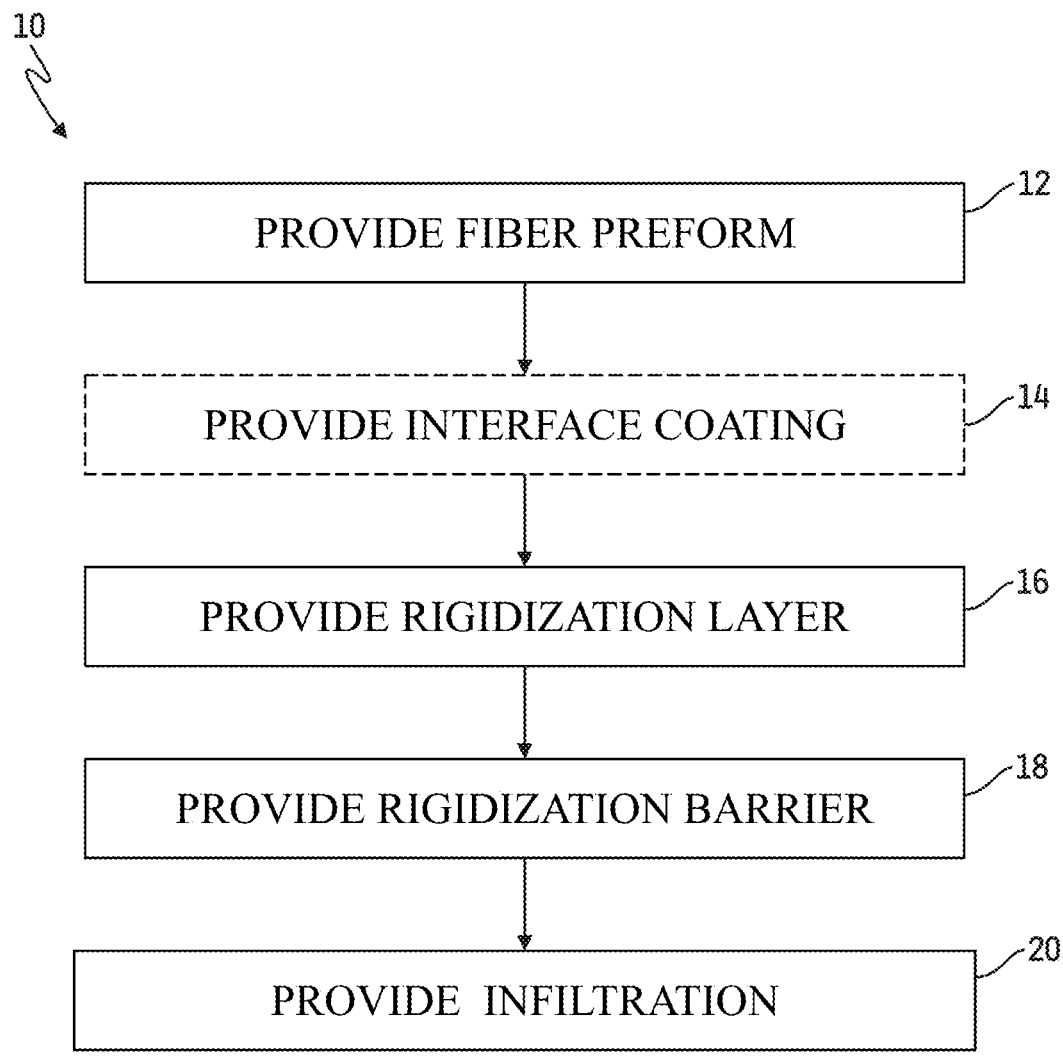
FIG. 1 is a simplified flow diagram of at least one illustrative method of manufacturing a ceramic matrix composite.

For the purposes of promoting an understanding of the principles of the disclosure, reference will now be made to a number of illustrative embodiments illustrated in the drawings and specific language will be used to describe the same.

Figure 2:
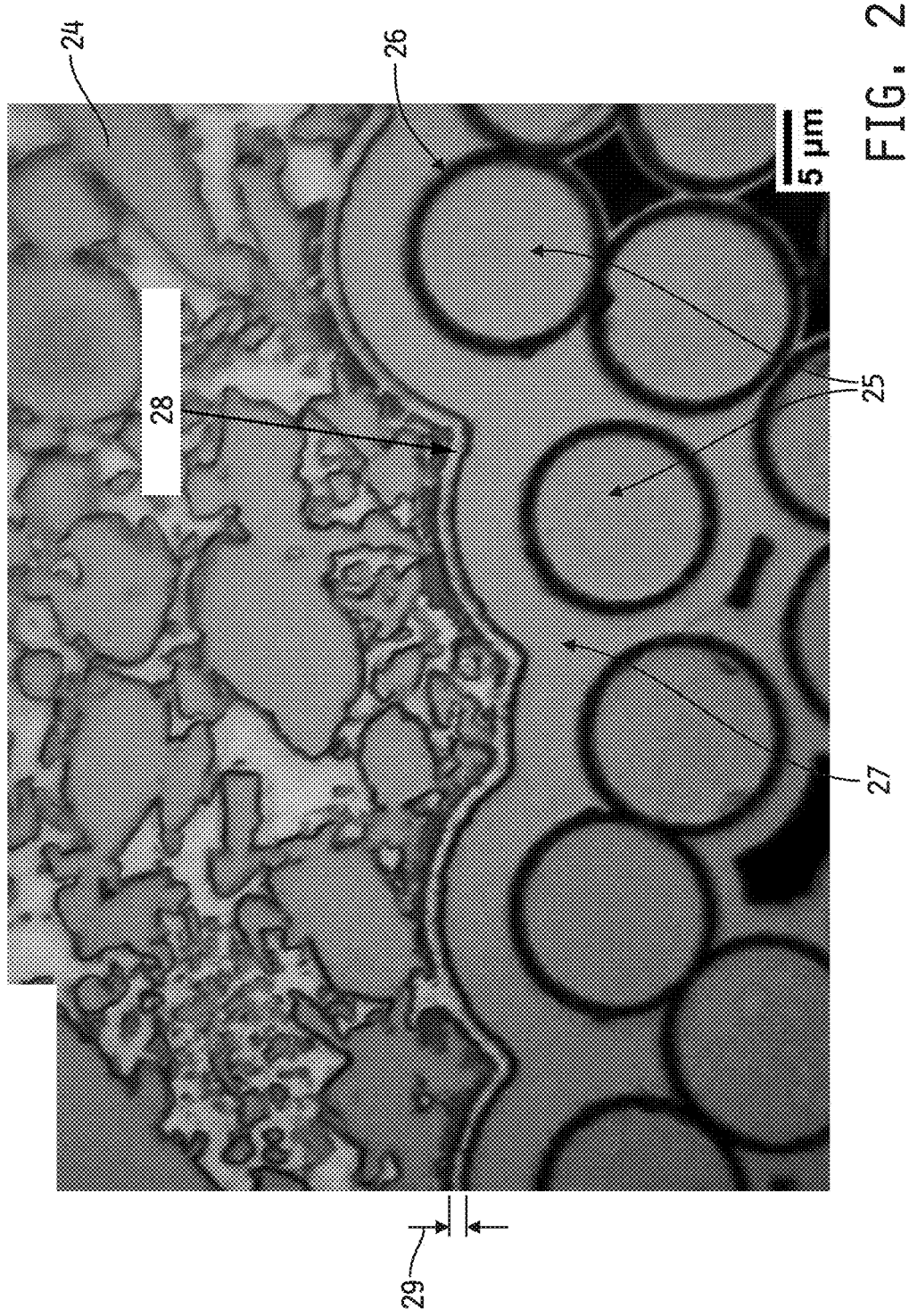
FIG. 2 is a microphotograph of a cross-section of an illustrative ceramic matrix composite according to the method of FIG. 1.

Referring to FIG. 1, an illustrative method 10 of producing or manufacturing an illustrative ceramic matrix composite (CMC) is shown. A cross-section of one such illustrative CMC manufactured according to the illustrative method 10 is depicted in FIG. 2. Generally, the method 10 illustratively comprises the steps of providing a fiber 25 preform step 12, providing or depositing a rigidization portion or layer 27 step 16, providing or depositing a rigidization barrier or barrier layer 28 step 18, and providing or depositing or introducing an infiltration or infiltration portion or infiltration layer 24 step 20. As used herein, the term providing may include introducing or depositing. The illustrative provided fiber preform comprises between about 14% and about 46% of the total volume of the CMC. The providing an infiltration layer 20 illustratively could include the steps of introducing particulate infiltration or slurry infiltration and introducing melt infiltration. Optionally, the illustrative method could also include providing a fiber interface coating step 14. It will be appreciated that one or more of the method steps, which will be described more fully herein, may be accomplished multiple times. For example and without limitation, the providing an interface coating step 14 could be accomplished more than once to increase the thickness of the coating 26 as desired, the providing a rigidization step 16 could be accomplished more than once to increase the amount and/or density of the rigidization portion or layer 27 as desired, the providing a rigidization barrier layer step 18 could be accomplished more than once to increase the thickness 29 of the barrier layer 28 as desired, and the providing infiltration step 20 could be accomplished more than once to increase the extent and/or density of the particulate and/or melt infiltration portion or layer 24.

Referring to FIG. 2, which is a micrograph of a cross-section of an illustrative CMC, as may be made by the illustrative method of manufacture, the generally cylindrical fibers 25, circular in cross-section, may be seen illustratively surrounded by an interface coating or layer 26. Illustratively, the fiber interface coating generally surrounds or coats the fiber. Illustratively, the fiber interface coating comprises between about 0.09% and about 11% of the total volume of the CMC. Illustratively, the interface coating may be deposited by any suitable method including for example chemical vapor infiltration (CVI). Non-exhaustive examples of suitable coatings include boron nitride (BN) and pyrolytic carbon (PyC). It will be appreciated that the type of coating, and even the need for a coating, may be dictated by the underlying fiber. For example, if the fiber is a silicon carbide (SiC) or a silicon-nitro-carbide (SiNC), then a fiber interface coating typically would be used. In the case of carbon fibers a carbon interface illustratively might be used. In the case of oxide ceramic fibers, an interface illustratively may or may not be used. Disposed between the fibers 25, is an illustrative rigidization layer or portion 27. Illustratively, there are also areas of porosity (dark regions in FIG. 2) between some fibers. Illustratively, the rigidization layer is disposed by CVI or any other suitable method. The rigidization layer illustratively comprises between about 14% and about 41% of the total volume of the CMC. Rigidization barrier 28 is provided or deposited, illustratively by CVI, on the exposed surface or border of the rigidization layer or portion 27. Illustratively, the rigidization barrier may range in width or thickness from about 0.1 μm and about 10 μm. Further illustratively, the rigidization barrier layer may range in width or thickness from about 1 μm and about 2 μm. The width or thickness illustratively may be determined by the number of depositions of the rigidization barrier. Illustratively, the rigidization barrier comprises between about 1% and about 11% of the total volume of the CMC. The barrier layer 28 thus includes a surface or border proximate to and in contact with the surface or border of the rigidization layer to which the barrier layer is deposited. These corresponding borders are in contact with and generally coterminous with one another in that the barrier layer is deposited on the surface or border of the rigidization layer along the entire length of the rigidization layer. In this manner, the barrier layer serves as a diffusion barrier that isolates the rigidization layer, and fibers imbedded therein, from the infiltration layer and melt attack. Illustratively, an aqueous slurry of particulate matter is introduced or infiltrated into the matrix. Illustratively at room temperature. Also infiltrated into the matrix is a suitable molten metal. For example, a silicon melt may be infiltrated, illustratively at high temperatures, for example in a furnace, that may exceed 2600° F. (1427° C.). Illustratively, the slurry particulate additives comprise between about 9% and about 56% of the total volume of the CMC. Further illustratively, the melt infiltration additives comprise between about 4% and about 21% of the total volume of the CMC. Illustratively, the particulate matter or slurry infiltration aids the capillary action of the metal melt infiltration. Illustratively, the barrier layer 28 may comprise SiNC, $Si_3N_4$, or PyC or a combination thereof. The introduction of PyC illustratively would provide a reactive layer of SiC that would impede the reaction between the molten silicon infiltration layer and the illustrative SiC rigidization layer. An illustrative barrier layer 28 of SiNC and/or Si3N4 could be deposited on the rigidization layer 27 as described herein and illustratively would provide a diffusion barrier between the rigidization layer, for example a SiC rigidization layer, and the infiltration layer (liquid, gas and solid state diffusion), for example the melt infiltration, which may be for example molten silicon. Illustratively, a combination barrier layer may be used. For example and without limitation, an illustrative combination of a SiNC and PyC layer may be used in cooperation such that the PyC layer enhances wetting of the silicon and reduces final residual silicon levels as a result of a reaction to form SiC, and such that the underlying SiNC layer is the primary silicon barrier.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A ceramic matrix composite comprising:
    a matrix; and
    a fiber preform embedded within the matrix;
    wherein the matrix includes a rigidization layer comprising silicon carbide on the fiber preform, an infiltration layer on the rigidization layer, and a barrier layer sandwiched between the rigidization layer and the infiltration layer, the barrier layer comprising silicon nitro-carbide or silicon nitride.

2. The ceramic matrix composite of claim 1 wherein the ceramic matrix composite material has a porosity of less than about 5 volume percent of the total ceramic matrix composite.

3. The ceramic matrix composite of claim 1 wherein the fiber preform comprises silicon carbide or silicon nitro-carbide fibers, and
    further comprising a fiber interface coating between the fiber preform and the rigidization layer, the fiber interface coating comprising boron nitride or pyrolytic carbon.

4. The ceramic matrix composite of claim 1 wherein the barrier layer has a thickness of between about 0.1 μm and about 10 μm.

5. The ceramic matrix composite of claim 1 wherein the barrier layer has a thickness of between about 1 μm and about 2 μm.

6. The ceramic matrix composite of claim 1 wherein the barrier layer comprises between about 2 volume percent and about 10 volume percent of the total ceramic matrix composite.

7. The ceramic matrix composite of claim 1 wherein the barrier layer comprises a combination barrier layer including an underlayer comprising the silicon nitro-carbide or silicon nitride and an overlayer comprising pyrolytic carbon.

8. The ceramic matrix composite of claim 1 wherein the barrier layer comprises silicon-nitro-carbide and pyrolytic carbon.

9. The ceramic matrix composite of claim 1 wherein the fiber preform comprises about 15 volume percent to about 45 volume percent of the total ceramic matrix composite; and wherein the rigidization layer comprises between about 15 volume percent and about 40 volume percent of the total ceramic matrix composite.

10. The ceramic matrix composite of claim 1 wherein the preform comprises fiber formed from a compound selected from the group consisting of: silicon-carbide and silicon nitro-carbide; and
    wherein the ceramic matrix composite further comprises a fiber interface coating generally encapsulating the fiber, the fiber interface coating comprising between about 0.1 volume percent and about 10 volume percent of the total ceramic matrix composite; and wherein the fiber interface coating is deposited by chemical vapor infiltration and comprises one or more compounds selected from the group consisting of: boron nitride and pyrolytic carbon.

11. The ceramic matrix composite of claim 1
    wherein the infiltration layer comprises slurry additives and melt additives;
    wherein the slurry additives comprise silicon-carbide particulates and the melt additives comprise silicon;
    wherein the slurry additives comprise between about 10 volume percent and about 55 volume percent of the total ceramic matrix composite; and
    wherein the melt additives comprise between about 5 volume percent and about 20 volume percent of the total ceramic matrix composite;
    wherein the rigidization layer comprises a silicon-carbide layer deposited by chemical vapor infiltration;
    wherein the barrier layer is deposited by chemical vapor infiltration;
    wherein the preform comprises fibers selected from the group consisting of: silicon-carbide fibers, silicon-nitro-carbide fibers, carbon fibers, and oxide ceramic fibers; and
    wherein the fibers are selected from the group consisting of: stoichiometric fibers, non-stoichiometric fibers, and a combination of stoichiometric fibers and non-stoichiometric fibers.

12. An article of manufacture made of a ceramic matrix composite comprising
    a matrix; and
    a fiber preform embedded within the matrix;
    wherein the matrix includes a rigidization layer comprising silicon carbide on the fiber preform, an infiltration layer on the rigidization layer, and a barrier layer sandwiched between the rigidization layer and the infiltration layer, the barrier layer comprising silicon nitro-carbide or silicon nitride.

* * * * *